US012564941B2

(12) United States Patent
Hayashi et al.

(10) Patent No.:  US 12,564,941 B2
(45) Date of Patent:       Mar. 3, 2026

(54) ROBOT CONTROL DEVICE, ROBOT CONTROL METHOD, AND RECORDING MEDIUM STORING ROBOT CONTROL PROGRAM

(71) Applicant: NEC Corporation, Tokyo (JP)

(72) Inventors: Yuki Hayashi, Tokyo (JP); Jun Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/103,946

(22) Filed: Jan. 31, 2023

(65) Prior Publication Data

US 2023/0249338 A1      Aug. 10, 2023

(30) Foreign Application Priority Data

Feb. 8, 2022    (JP) ................................. 2022-017588

(51) Int. Cl.
 *B25J 9/16*          (2006.01)
 *G05B 19/4155*      (2006.01)
(52) U.S. Cl.
 CPC ........ *B25J 9/1602* (2013.01); *G05B 19/4155* (2013.01); *G05B 2219/39001* (2013.01); *G05B 2219/50391* (2013.01)
(58) Field of Classification Search
 CPC ............... B25J 9/1602; G05B 19/4155; G05B 2219/50391; G05B 2219/39001
 See application file for complete search history.

(56) References Cited

U.S. PATENT DOCUMENTS

2019/0232488 A1*  8/2019  Levine ..................... B25J 9/161
2019/0262992 A1*  8/2019  Kim ..................... G05D 1/0234

2019/0384273 A1*  12/2019  Han ...................... G05B 13/027
2020/0310364 A1*  10/2020  Asai ................... G05B 19/4185
2022/0286267 A1*   9/2022  Niimi ...................... H04L 67/12
2023/0123463 A1*   4/2023  Lin ......................... B25J 9/1651
                                                            700/248
2023/0302645 A1*   9/2023  Lin ......................... B25J 9/1666

FOREIGN PATENT DOCUMENTS

JP        2011-083834 A      4/2011
JP        2012-183640 A      9/2012
JP        2021-175590 A      11/2021
WO        2021/261018 A1     12/2021

OTHER PUBLICATIONS

JP Office Action for JP Application No. 2022-017588, mailed on Nov. 18, 2025 with English Translation.

* cited by examiner

*Primary Examiner* — Jay Khandpur

(74) *Attorney, Agent, or Firm* — Sughrue Mion, PLLC

(57)          ABSTRACT

A robot control device includes a generation unit that generates control information for controlling a robot to be controlled for each of a plurality of control cycles for the robot, an acquisition unit that acquires control environment information relevant to the control cycles, a selection unit that selects any one of a plurality of the control information based on the acquired control environment information and a relevance between the control environment information and the control cycles, and a control unit that controls the robot using the selected control information, thereby suitably controlling the robot according to the control environment of the robot in a case where the control cycles of the robot depends on the varying control environment of the robot.

9 Claims, 10 Drawing Sheets

Fig. 2

171 ROBOT CONTROL PLAN

| TIME (sec) | X COORDINATE | Y COORDINATE | Z COORDINATE |
|---|---|---|---|
| 0. 1 | 1 | 5 | 4 |
| 0. 2 | 1 | 5 | 6 |
| 0. 3 | 1 | 5 | 8 |
| 0. 4 | 3 | 5 | 8 |
| ⋮ | ⋮ | ⋮ | ⋮ |

Fig. 4

171 ROBOT CONTROL PLAN

| TIME (sec) | X COORDINATE | Y COORDINATE | Z COORDINATE |
|---|---|---|---|
| 1 | 1 | 5 | 4 |
| 2 | 3 | 5 | 8 |
| 3 | 7 | 5 | 9 |
| 4 | 9 | 2 | 1 |
| ⋮ | ⋮ | ⋮ | ⋮ |

Fig. 7

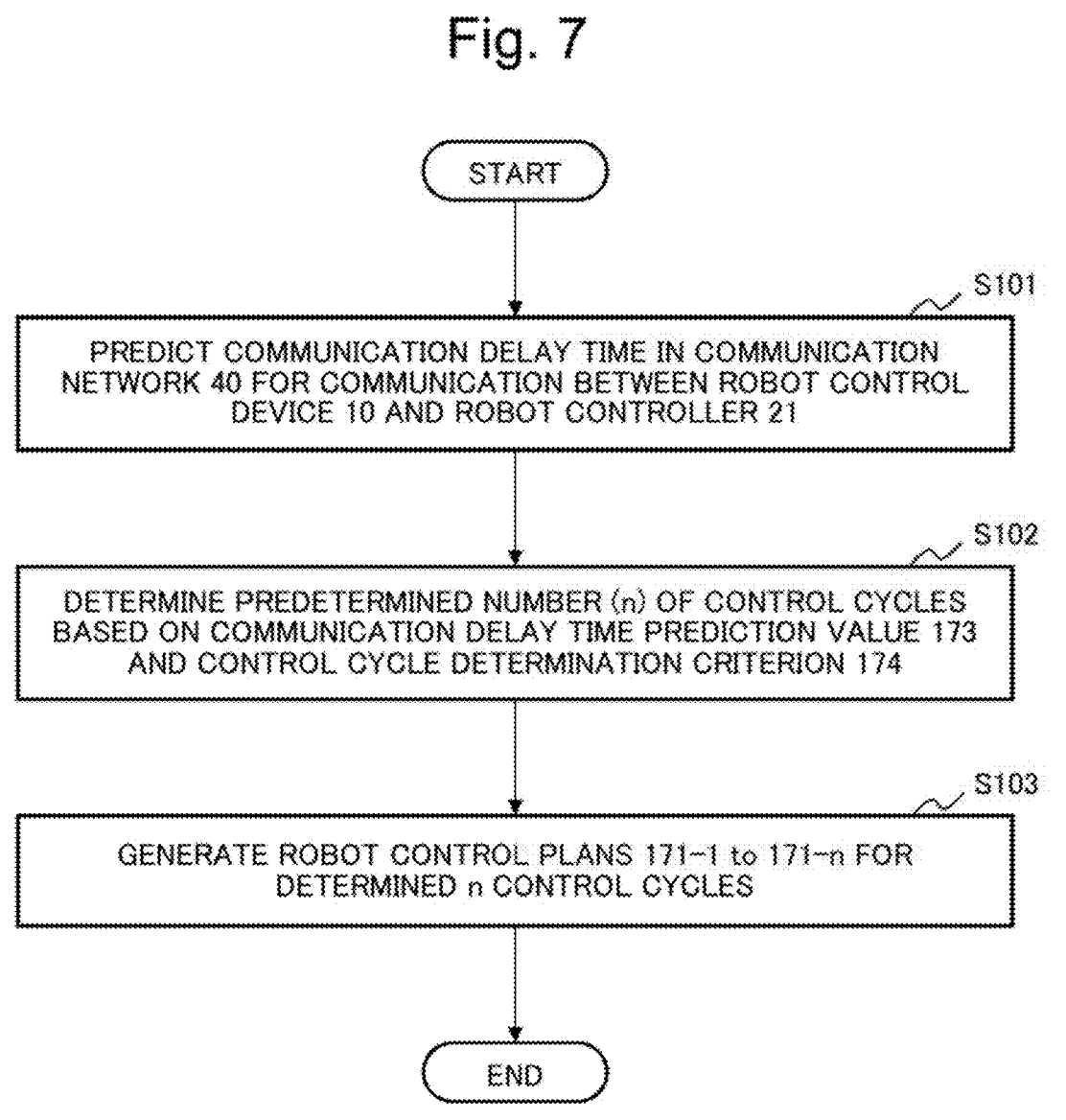

```
                    ┌──────────┐
                    │  START   │
                    └──────────┘
                         │
                         ▼
```

S101

```
┌────────────────────────────────────────────────────┐
│   PREDICT COMMUNICATION DELAY TIME IN COMMUNICATION  │
│   NETWORK 40 FOR COMMUNICATION BETWEEN ROBOT CONTROL │
│        DEVICE 10 AND ROBOT CONTROLLER 21             │
└────────────────────────────────────────────────────┘
```

S102

```
┌────────────────────────────────────────────────────┐
│  DETERMINE PREDETERMINED NUMBER (n) OF CONTROL CYCLES│
│  BASED ON COMMUNICATION DELAY TIME PREDICTION VALUE 173│
│    AND CONTROL CYCLE DETERMINATION CRITERION 174     │
└────────────────────────────────────────────────────┘
```

S103

```
┌────────────────────────────────────────────────────┐
│   GENERATE ROBOT CONTROL PLANS 171-1 to 171-n FOR    │
│           DETERMINED n CONTROL CYCLES                │
└────────────────────────────────────────────────────┘
                         │
                         ▼
                    ┌──────────┐
                    │   END    │
                    └──────────┘
```

Fig. 8

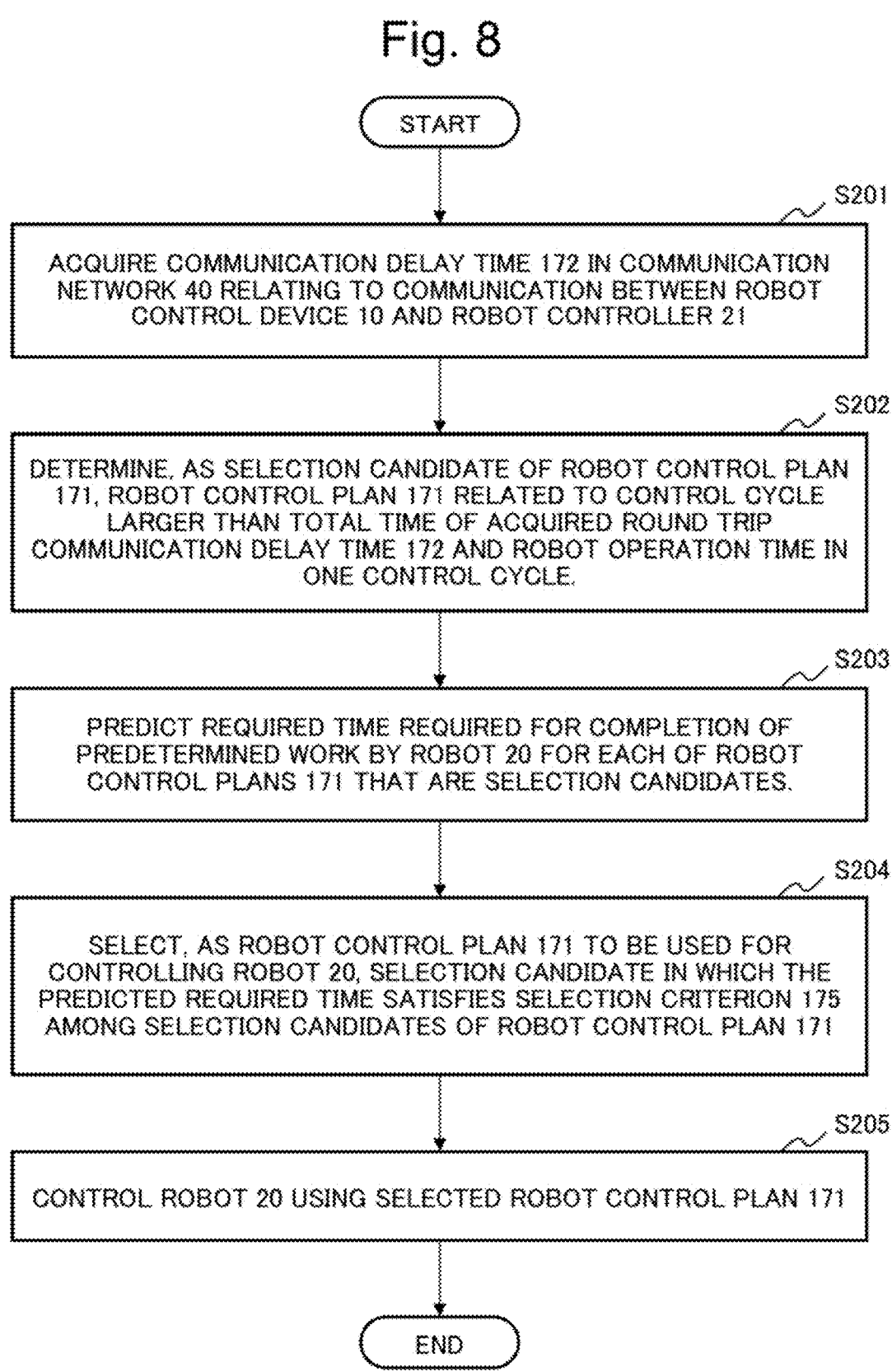

START

S201

ACQUIRE COMMUNICATION DELAY TIME 172 IN COMMUNICATION NETWORK 40 RELATING TO COMMUNICATION BETWEEN ROBOT CONTROL DEVICE 10 AND ROBOT CONTROLLER 21

S202

DETERMINE, AS SELECTION CANDIDATE OF ROBOT CONTROL PLAN 171, ROBOT CONTROL PLAN 171 RELATED TO CONTROL CYCLE LARGER THAN TOTAL TIME OF ACQUIRED ROUND TRIP COMMUNICATION DELAY TIME 172 AND ROBOT OPERATION TIME IN ONE CONTROL CYCLE.

S203

PREDICT REQUIRED TIME REQUIRED FOR COMPLETION OF PREDETERMINED WORK BY ROBOT 20 FOR EACH OF ROBOT CONTROL PLANS 171 THAT ARE SELECTION CANDIDATES.

S204

SELECT, AS ROBOT CONTROL PLAN 171 TO BE USED FOR CONTROLLING ROBOT 20, SELECTION CANDIDATE IN WHICH THE PREDICTED REQUIRED TIME SATISFIES SELECTION CRITERION 175 AMONG SELECTION CANDIDATES OF ROBOT CONTROL PLAN 171

S205

CONTROL ROBOT 20 USING SELECTED ROBOT CONTROL PLAN 171

END

Fig. 10

ROBOT CONTROL DEVICE, ROBOT CONTROL METHOD, AND RECORDING MEDIUM STORING ROBOT CONTROL PROGRAM

This application is based upon and claims the benefit of priority from Japanese Patent Application No. 2022-017588, filed on Feb. 8, 2022, the disclosure of which is incorporated herein in its entirety by reference.

TECHNICAL FIELD

The present invention relates to a robot control device, a robot control method, and a robot control program.

BACKGROUND ART

Robots are used in factories or various places in daily life, and technologies for suitably controlling the operation of robots in order to cause the robots to execute desired operations are expected.

In relation to such a technique, PTL 1 (JP 2021-175590 A) discloses a robot operation plan optimization method using a refined initial reference path to quickly converge to a solution when a large number of iterations are required to reach a final convergent solution. In this method, when calculating anew path using motion optimization, a previously calculated candidate reference path having a similar start point and a similar target point and collision avoidance environmental constraints for the new path is selected from the storage device. In this method, in order to generate an initial reference path, the candidate reference path is adjusted in consideration of a difference between a start point and a target point of a new path compared to a start point and a target point of a previously calculated path at all state points along the length. In this method, the initial reference path adjusted to match the start point and the target point is used as a start state for motion optimization calculation. In this method, an initial reference path similar to a new path that has finally converged is used.

PTL 2 (JP 2011 083834) discloses a robot control system including an operation control device that includes a controller integration unit that controls a program and data of robot control and causes a robot to perform a desired operation, and an operation instruction device that includes a storage unit and gives an operation instruction to the robot. The operation control device in this system includes a program execution unit that detects a predetermined instruction from a control program that controls the robot to output the detected predetermined instruction and data related to the robot control to a proxy unit without passing through the controller integration unit. The proxy unit outputs the received predetermined instruction and the data regarding the robot control to the communication unit, or outputs the data regarding the robot control received from the communication unit to the program execution unit without passing through the controller integration unit. Then, the communication unit outputs the predetermined instruction received from the proxy unit and data related to robot control to the operation instruction device.

PTL 3 (JP 2012-183640 A) discloses a system that performs synchronization control between at least two robot arms. The system includes a robot controller that communicates over a network to transmit synchronization information from the master controller to one or more slave controllers to coordinate the manufacturing process. The system takes into account delays in network communications when synchronizing event timing for process and motion synchronization.

SUMMARY

A main object of the present invention is to suitably control a robot according to a control environment of the robot in a case where a control cycle of the robot depends on the varying control environment of the robot, for example, the communication delay time.

A robot control device according to an aspect of the present invention includes a generation means configured to generate control information for controlling a robot to be controlled for each of a plurality of control cycles for the robot, an acquisition means configured to acquire control environment information relevant to the control cycles, a selection means configured to select any one of a plurality of pieces of the control information based on the acquired control environment information and a relevance between the control environment information and the control cycles, and a control means configured to control the robot using the selected control information.

In another viewpoint of achieving the above object, a robot control method according to an aspect of the present invention includes, by an information processing device, generating control information for controlling a robot to be controlled for each of a plurality of control cycles for the robot, acquiring control environment information relevant to the control cycles, selecting any one of a plurality of pieces of the control information based on the acquired control environment information and a relevance between the control environment information and the control cycles, and controlling the robot using the selected control information.

In a further viewpoint of achieving the above object, a robot control program according to an aspect of the present invention causes a computer to execute generating control information for controlling a robot to be controlled for each of a plurality of control cycles for the robot, acquiring control environment information relevant to the control cycles, selecting any one of a plurality of pieces of the control information based on the acquired control environment information and a relevance between the control environment information and the control cycles, and controlling the robot using the selected control information.

Furthermore, the present invention can also be achieved by a non-volatile computer-readable recording medium storing the robot control program (computer program).

BRIEF DESCRIPTION OF THE DRAWINGS

FIG. 2 is a diagram illustrating a first example of data of a robot control plan according to the first example embodiment of the present invention;

FIG. 4 is a diagram illustrating a second example of data of the robot control plan according to the first example embodiment of the present invention;

FIG. 7 is a flowchart illustrating an operation in which the robot control device according to the first example embodiment of the present invention generates the robot control plan;

FIG. 8 is a flowchart illustrating an operation in which the robot control device according to the first example embodiment of the present invention controls the robot using the robot control plan;

FIG. 10 is a block diagram illustrating a configuration of an information processing device capable of achieving the robot control device according to the first example embodiment or the robot control device according to the second example embodiment of the present invention.

EXAMPLE EMBODIMENT

Hereinafter, example embodiments of the present invention will be described in detail with reference to the drawings.

First Example Embodiment

Figure 1:
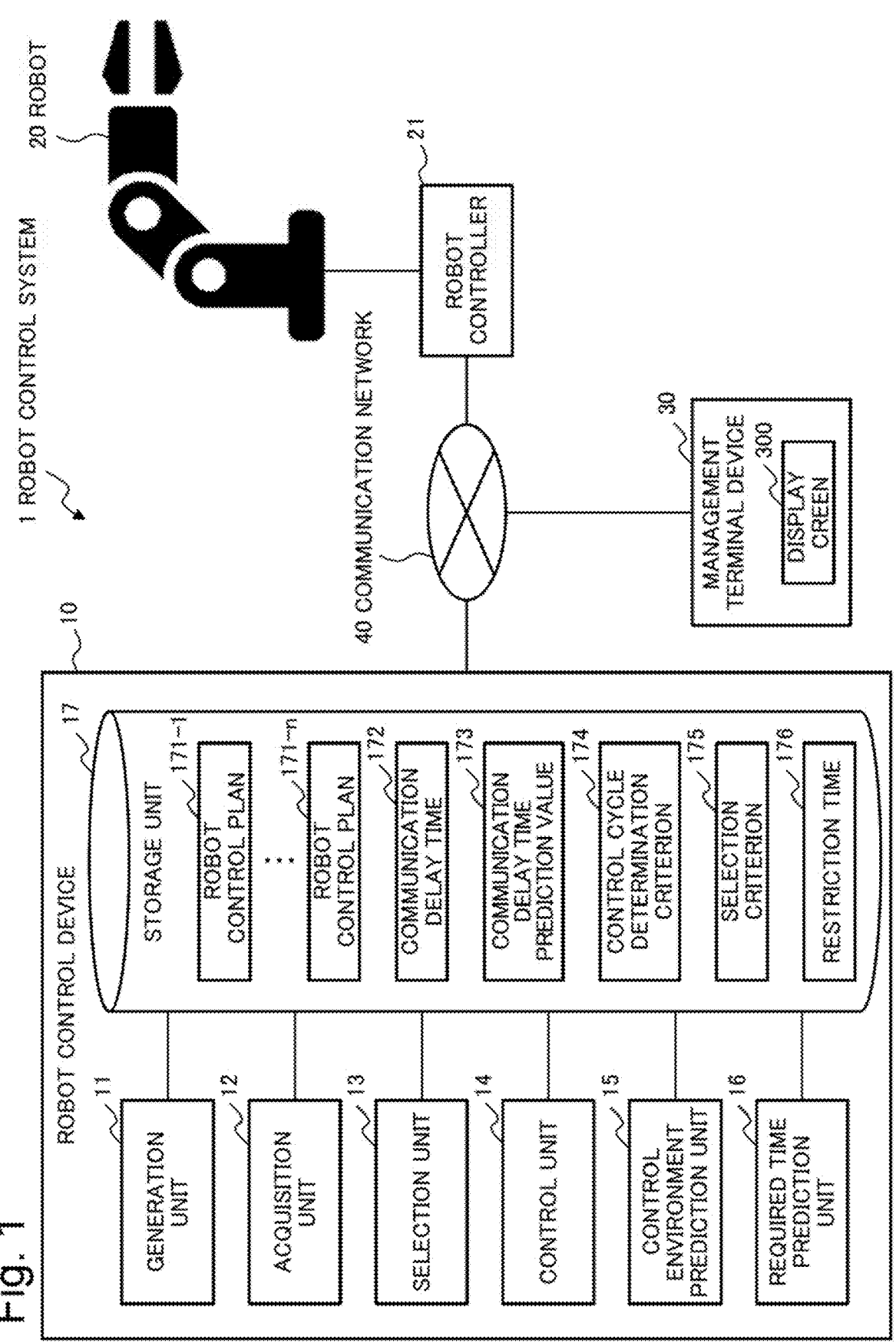
FIG. 1 is a block diagram showing a configuration of a robot control device according to the first example embodiment of the present invention.

FIG. 1 is a block diagram illustrating a configuration of a robot control system 1 according to the first embodiment of the present invention. The robot control system 1 includes a robot control device 10, a robot 20, a robot controller 21, and a management terminal device 30. The robot control device 10, the robot controller 21, and the management terminal device 30 are communicably connected via a communication network 40. Note that the management terminal device 30 may be directly connected to the robot control device 10 in a communicable manner.

The communication network 40 is, for example, a communication network such as the Internet. In communication via the communication network 40, a communication delay time usually occurs. Then, the communication delay time varies depending on, for example, a congestion situation of communication in the communication network 40, and in general, the communication delay time is longer as the communication is congested.

The robot control device 10 is an information processing device such as a server that controls the operation of the robot 20. Information for controlling the robot 20 generated by the robot control device 10 is transmitted to the robot controller 21 via the communication network 40. The robot controller 21 controls the movement of a servomotor (not illustrated) included in the robot 20 based on information received from the robot control device 10. Then, the robot controller 21 transmits a control result (operation result) of the robot 20 to the robot control device 10 via the communication network 40.

The robot 20 is a robot that includes, for example, a robot arm as exemplified in FIG. 1, and performs an operation of gripping an object to be moved and moving the object to be moved from one place to another. Note that the form of the robot 20 is not limited to a form including a robot arm.

The management terminal device 30 is, for example, a personal computer or another information processing device used when a user who uses the robot control device 10 inputs information to the robot control device 10 or confirms information output from the robot control device 10. The management terminal device 30 includes a display screen 300 that displays information output from the robot control device 10.

The robot control device 10 includes a generation unit 11, an acquisition unit 12, a selection unit 13, a control unit 14, a control environment prediction unit 15, a required time prediction unit 16, and a storage unit 17. The generation unit 11, the acquisition unit 12, the selection unit 13, the control unit 14, the control environment prediction unit 15, and the required time prediction unit 16 are examples of a generation means, an acquisition means, a selection means, a control means, a control environment prediction means, and a required time prediction means, respectively.

The storage unit 17 is, for example, a storage device such as a random access memory (RAM) or a hard disk 904 described later with reference to FIG. 10. The storage unit 17 stores robot control plans 171-1 to 171-$n$ (where n is an any integer equal to or more than 2), a communication delay time 172, a communication delay time prediction value 173, a control cycle determination criterion 174, a selection criterion 175, and a restriction time 176. Note that, in the present example embodiment, hereinafter, the robot control plans 171-1 to 171-$n$ may be collectively or at least one thereof may be referred to as a robot control plan 171. The robot control plan 171 and the communication delay time 172 are an example of control information and control environment information, respectively. Details of these pieces of information stored in the storage unit 17 will be described later.

The generation unit 11 generates the robot control plans 171-1 to 171-$n$ that are control information for controlling the robot 20 to perform a predetermined work (task) for each of a plurality of control cycles for the robot 20. The generation unit 11 can generate the robot control plan 171 using, for example, an algorithm such as the above-described goal-oriented task planning. Note that, since the algorithm is an existing technology, a detailed description thereof will be omitted in the present example embodiment. Note that the robot control device 10 may include a plurality of generation units 11 each of which generates one robot control plan 171 or may include one generation unit 11 that can generate a plurality of robot control plans 171.

FIG. 2 is a diagram illustrating a first example of data of the robot control plan 171 according to the present example embodiment. In the robot control plan 171 illustrated in FIG. 2, since the time is an interval of 0.1 seconds, the control cycle of the robot 20 regarding the robot control plan 171 illustrated in FIG. 2 is 0.1 seconds.

The robot control plan 171 illustrated in FIG. 2 represents an X coordinate, a Y coordinate, and a Z coordinate that are three-dimensional coordinates of the position of the robot 20 at each time. Note that, in the present example embodiment, hereinafter, the position represented by the three-dimensional coordinates is represented by (X coordinate value, Y coordinate value, Z coordinate value). In the present example embodiment, the coordinates illustrated in FIG. 2 represent, for example, the position of the distal end portion (portion for gripping the object to be moved) of the robot arm of the robot 20.

According to the robot control plan 171 illustrated in FIG. 2, the robot control device 10 performs control to move the distal end portion of the robot 20 to coordinates (1, 5, 4), coordinates (1, 5, 6), coordinates (1, 5, 8), and coordinates (3, 5, 8) 0.1 seconds, 0.2 seconds, 0.3 seconds, and 0.4 seconds after the start of the operation of the robot, respectively.

Figure 3:
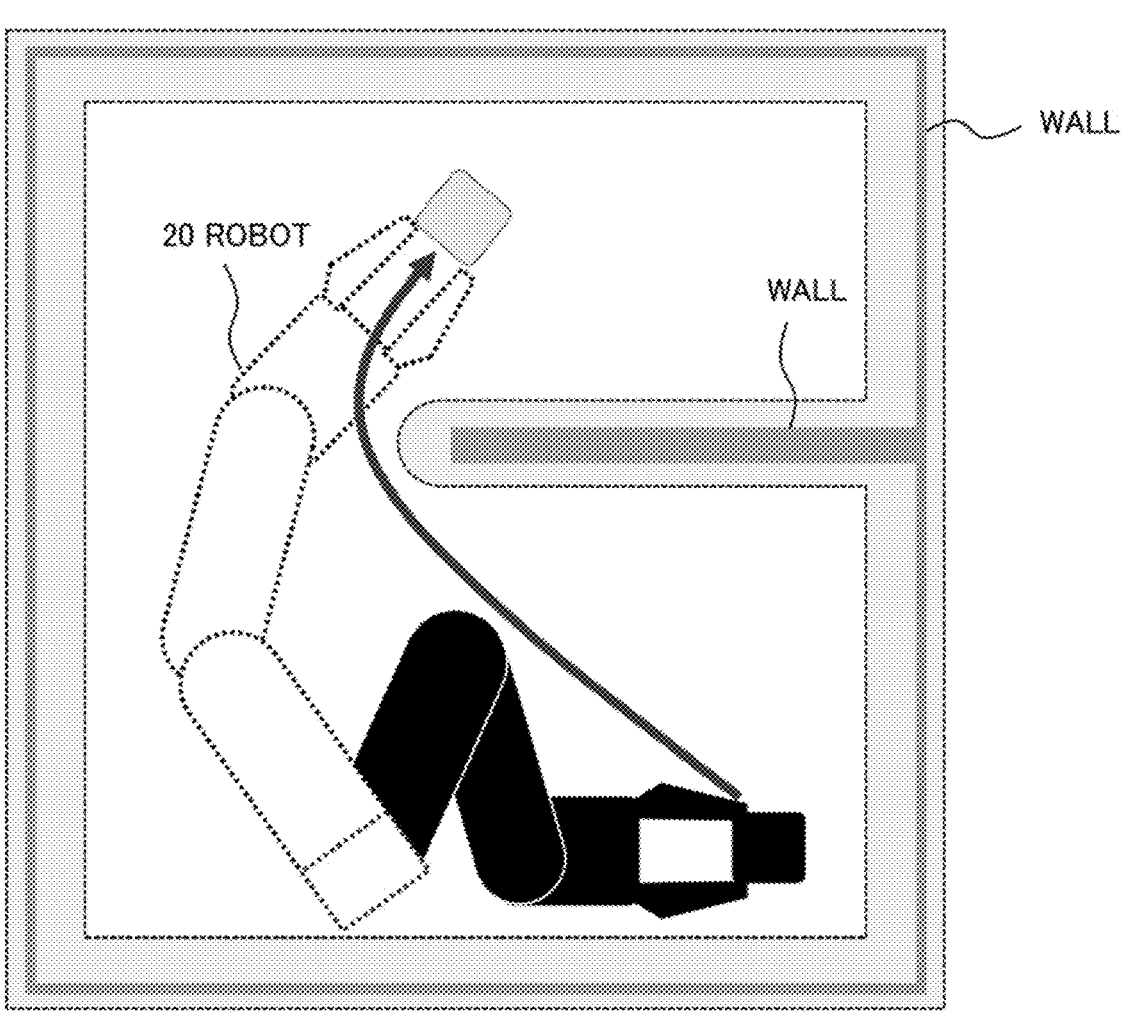
FIG. 3 is a diagram illustrating a movable range of a robot when the robot control device according to the first example embodiment of the present invention controls the robot using the robot control plan illustrated in FIG. 2.

FIG. 3 is a diagram illustrating a movable range of the robot 20 when the robot control device 10 according to the example embodiment controls the robot 20 using the robot control plan 171 illustrated in FIG. 2. In FIG. 3, gray lines represent a wall (obstacle), and an unshaded portion excluding a portion shaded to surround the wall represents the movable range of the distal end portion of the robot 20.

FIG. 4 is a diagram illustrating a second example of data of the robot control plan 171 according to the present example embodiment. In the robot control plan 171 illustrated in FIG. 4, since the time is an interval of 1 second, the control cycle of the robot 20 regarding the robot control plan 171 illustrated in FIG. 4 is 1 second.

According to the robot control plan 171 illustrated in FIG. 4, the robot control device 10 performs control to move the distal end portion of the robot 20 to coordinates (1, 5, 4), coordinates (3, 5, 8), coordinates (7, 5, 9), and coordinates (9, 2, 1) 1 second, 2 seconds, 3 seconds, and 4 seconds after the start of the operation of the robot, respectively. Since the control cycle of the robot 20 in the example illustrated in FIG. 4 is longer than that in the example illustrated in FIG. 2, the movement amount of the robot 20 per control cycle in the example illustrated in FIG. 4 is larger than that in the example illustrated in FIG. 2.

Figure 5:
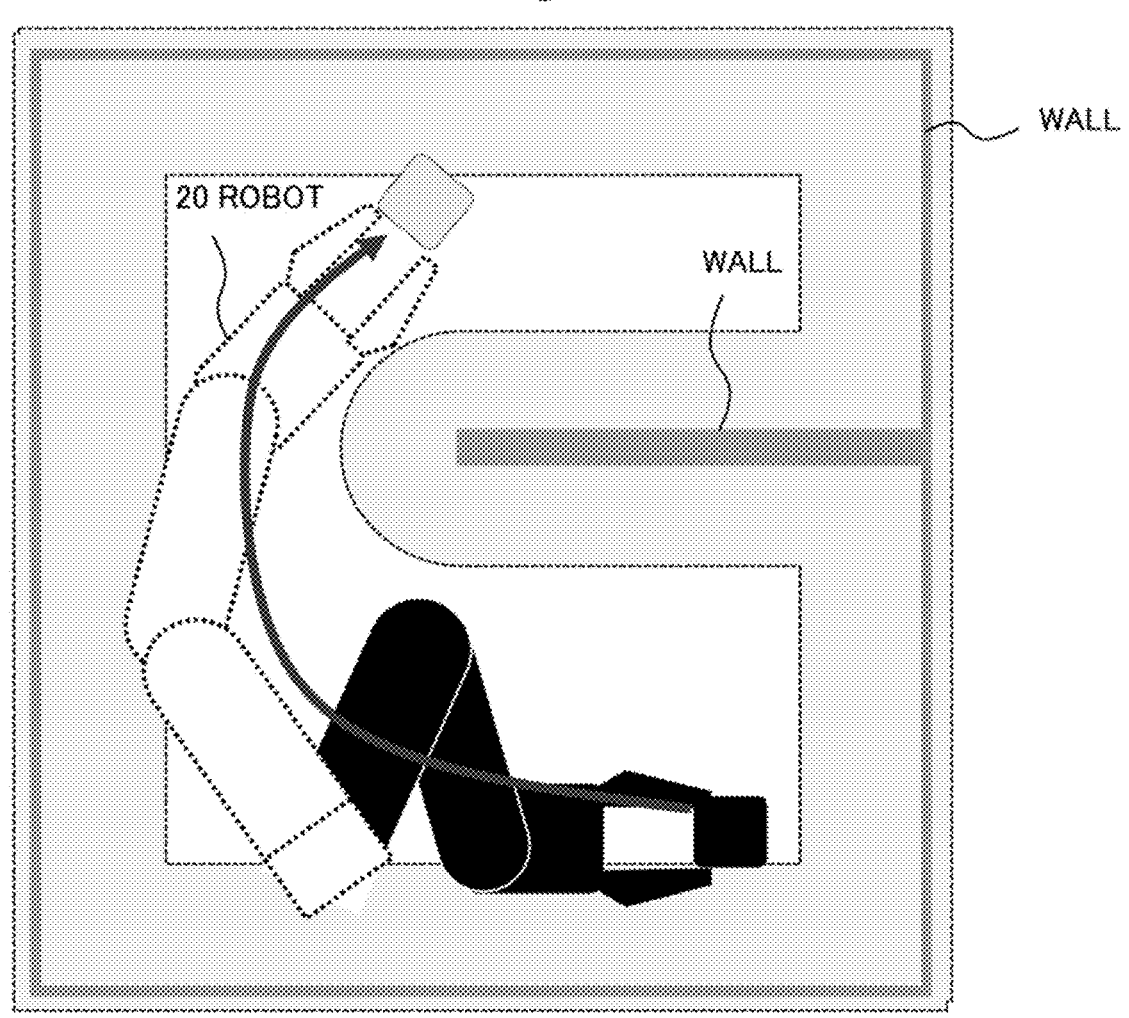
FIG. 5 is a diagram illustrating a movable range of the robot when the robot control device according to the first example embodiment of the present invention controls the robot using the robot control plan illustrated in FIG. 4.

FIG. 5 is a diagram illustrating a movable range of the robot 20 when the robot control device 10 according to the example embodiment controls the robot 20 using the robot control plan 171 illustrated in FIG. 4. In the example illustrated in FIG. 5, the robot control device 10 cannot control the robot 20 to move smoothly unlike the example illustrated in FIG. 3. Therefore, the movable range of the robot 20 in the example illustrated in FIG. 5 is narrower than that in the example illustrated in FIG. 3 in such a way that the robot 20 does not collide with the wall.

The value of the control cycle of the robot 20 and the number (that is, the value of n described above) of the robot control plans 171 to be generated, which are necessary for the generation of the robot control plan 171 by the generation unit 11, are given via, for example, an input operation to the management terminal device 30 by the user. In this case, regarding the communication between the robot control device 10 and the robot controller 21, the user may give a value of the control cycle of the robot 20 and the number of robot control plans 171 to be generated based on the communication delay time 172 in the assumed communication network 40 and the variation amount thereof.

Alternatively, the value of the control cycle of the robot 20 and the number of the robot control plans 171 to be generated, which are necessary for the generation of the robot control plan 171 by the generation unit 11, may be values calculated by the robot control device 10. In this case, the control environment prediction unit 15 illustrated in FIG. 1 predicts the communication delay time in the communication network 40 to store the communication delay time prediction value 173 that is the prediction result in the storage unit 17. For example, the control environment prediction unit 15 can obtain the communication delay time prediction value 173 from the results of the communication delay time in the communication network 40 that occurred in the past. Since the communication delay time depends on the congestion situation of communication in the communication network 40 and the like, the control environment prediction unit 15 may obtain the communication delay time prediction value 173 based on the communication delay time for each time zone in the communication network 40, for example. Note that the control environment prediction unit 15 may be provided in an external device communicably connected to the communication network 40.

The generation unit 11 determines a predetermined number (n) of control cycles based on the communication delay time prediction value 173 obtained by the control environment prediction unit 15 and the control cycle determination criterion 174 stored in the storage unit 17. The control cycle determination criterion 174 is a criterion representing the relationship between the communication delay time prediction value 173 and the value of the control cycle of the robot 20 and the number of robot control plans 171 generated by the generation unit 11, and is given by the user, for example.

Figure 6:
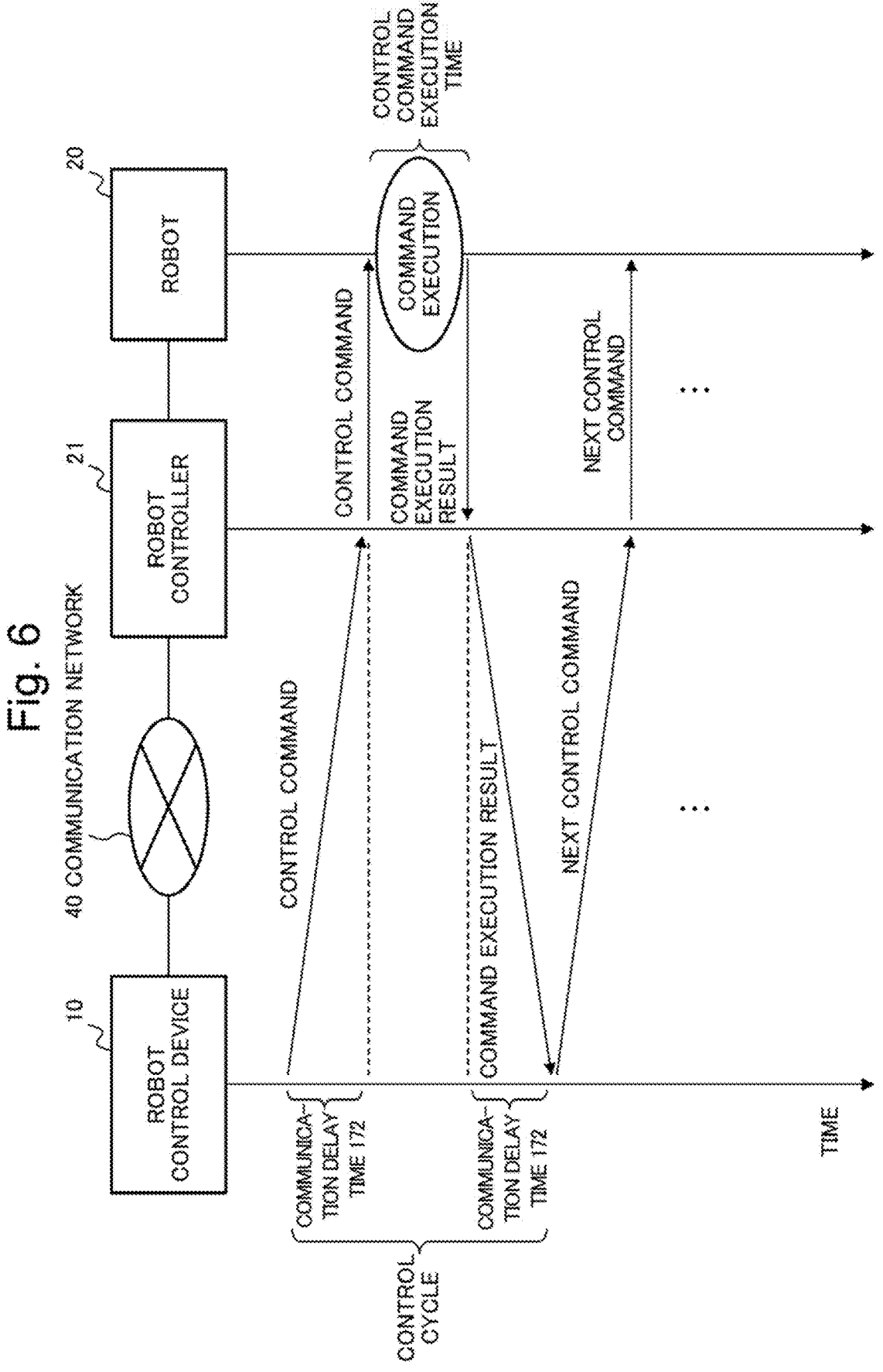
FIG. 6 is a sequence diagram related to control of the robot by the robot control device according to the first example embodiment of the present invention.

FIG. 6 is a sequence diagram related to the control of the robot 20 by the robot control device 10 according to the present example embodiment. The robot control device 10 transmits a control command for controlling the operation of the robot 20 to the robot controller 21 via the communication network 40 for each control cycle. The robot controller 21 controls the robot 20 in such a way as to execute the control command received from the robot control device 10. The robot 20 performs the operation indicated by the control command, and the robot controller 21 transmits an execution result of the control command including information indicating the position of the robot 20 after performing the operation indicated by the control command to the robot control device 10 via the communication network 40. After receiving the execution result of the control command from the robot controller 21, the robot control device 10 transmits the next control command in the next control cycle to the robot controller 21.

According to the sequence diagram exemplified in FIG. 6, the control cycle of the robot 20 is required to be longer than the total time of the round-trip communication delay time between the robot control device 10 and the robot controller 21 and the execution time of the control command by the robot 20. However, in the sequence diagram illustrated in FIG. 6, the communication delay time between the robot controller 21 and the robot 20 is assumed to be negligible.

The control cycle determination criterion 174 described above represents the relationship between the control cycle of the robot 20 illustrated in FIG. 6 and the communication delay time in the communication network 40. For example, a case will be considered in which the control cycle determination criterion 174 indicates that a control cycle of ±0.01 seconds and ±0.02 seconds with a control cycle obtained based on the relationship illustrated in FIG. 6 as a central value is also used for generation of the robot control plan 171 from the communication delay time prediction value 173 obtained by the control environment prediction unit 15. In this case, in a case where the control cycle obtained from the communication delay time prediction value 173 obtained by the control environment prediction unit 15 is, for example, 0.1 seconds, the generation unit 11 generates robot control plans 171-1 to 171-5 (that is, n=5) in a case where the control cycle is 0.08 seconds, 0.09 seconds, 0.1 seconds, 0.11 seconds, and 0.12 seconds.

The generation unit 11 stores the robot control plans 171-1 to 171-$n$ generated as described above in the storage unit 17 in association with the communication delay time.

The acquisition unit 12 illustrated in FIG. 1 acquires the communication delay time 172 in the communication network 40 regarding communication between the robot control device 10 and the robot controller 21. The acquisition unit 12 acquires, for example, the communication delay time 172 input by the user via the management terminal device 30.

Alternatively, the acquisition unit 12 may acquire the communication delay time 172 measured by an external measurement device (not illustrated). The acquisition unit 12 may acquire the communication delay time 172 before the robot control device 10 starts controlling the robot 20 or may acquire the communication delay time 172 at any time while the robot control device 10 is performing control on the robot 20.

The selection unit 13 selects any one of the robot control plans 171-1 to 171-n based on the communication delay time 172 acquired by the acquisition unit 12 and the selection criterion 175. The selection criterion 175 is a criterion indicating the relevance between the communication delay time 172 and the control cycle of the robot 20.

As described above with reference to FIG. 6, the selection criterion 175 represents selection of the robot control plan 171 regarding the control cycle that satisfies that the control cycle is longer than the sum of the round-trip communication delay time 172 between the robot control device 10 and the robot controller 21 and the time required for the operation of the robot 20 in one control cycle. Then, the selection criterion 175 represents that, among the robot control plans 171 satisfying the above-described requirements, the robot control plan 171 having the shortest required time required for completion of the predetermined work (task) by the robot 20 indicated by the robot control plan 171 is selected.

The required time prediction unit 16 predicts the required time required for completion of the predetermined work by the robot 20 described above in a case where the individual robot control plan 171 is used. The required time prediction unit 16 can predict the required time from the value of the control cycle and the number of control commands given to the robot 20 (that is, the number of rows of the robot control plan 171 illustrated in FIG. 2 or 4) in the robot control plan 171 illustrated in FIG. 2 or 4.

In a case where the restriction time 176 (threshold value) until the predetermined work by the robot 20 indicated by the robot control plan 171 is completed is stored in the storage unit 17, the selection criterion 175 may represent that the robot control plan 171 having the longest control cycle is selected of the robot control plans 171 satisfying that the required time described above is equal to or less than the restriction time 176. In this case, the selection criterion 175 is based on the idea that as long as the fact that the required time is equal to or less than the restriction time 176 is satisfied, the length of the required time is not a concern, and the longer the control cycle, the smaller the amount of communication between the robot control device 10 and the robot controller 21. Note that the restriction time 176 is assumed to be given, for example, via an input operation on the management terminal device 30 by the user.

The selection unit 13 may also display identification information capable of identifying the selected robot control plan 171 on, for example, a display device (not illustrated) included in the robot 20, the display screen 300 of the management terminal device 30, or the like. The display device included in the robot 20 may be, for example, a device capable of displaying characters, a plurality of light bulbs capable of expressing identification information by a lighting pattern, or the like.

The selection unit 13 may also output a log including the communication delay time 172 acquired by the acquisition unit 12 and identification information for identifying the selected robot control plan 171 to the storage unit 17, the management terminal device 30, or the like. The log may include information indicating the main body of the selected robot control plan 171, the time when the control on the robot 20 is executed, and the like.

The control unit 14 controls the robot 20 using the robot control plan 171 selected by the selection unit 13. For example, it is assumed that the fact that the data of the robot control plan 171 selected by the selection unit 13 is as illustrated in FIG. 2, and the coordinates of the position of the distal end portion of the robot 20 when the control of the robot 20 is started are (1, 4, 4) is given to the robot control device 10 from the robot controller 21. In this case, from the difference between the coordinates (1, 5, 4) after 0.1 seconds and the coordinates (1, 4, 4) at the start of control, the control unit 14 transmits, to the robot controller 21, a control command for moving the distal end portion of the robot 20 by one in the positive direction on the Y-axis after 0.1 seconds from the start of control. Similarly, from the difference between the coordinates (1, 5, 6) after 0.2 seconds and the coordinates (1, 5, 4) after 0.1 seconds, the control unit 14 transmits, to the robot controller 21, a control command for moving the distal end portion of the robot 20 by two in the positive direction on the Z-axis after 0.2 seconds from the start of control. The control unit 14 similarly transmits, to the robot controller 21, a control command for moving the distal end portion of the robot 20 to the position indicated by the robot control plan 171 at every control cycle even after 0.3 seconds from the start of control.

The robot controller 21 controls the robot 20 in such a way that the distal end portion of the robot 20 moves to a position indicated by the control command received from the control unit 14.

The acquisition unit 12 may acquire the communication delay time 172 at any time while the control unit 14 controls the robot 20, and the selection unit 13 may select any one of the robot control plans 171 according to the communication delay time 172 acquired by the acquisition unit 12 at any time. In this case, when the robot control plan 171 in use is different from the robot control plan 171 newly selected by the selection unit 13, the control unit 14 temporarily stops the control of the robot 20, and then resumes the control of the robot 20 using the communication delay time 172 newly selected by the selection unit 13.

As illustrated in FIG. 2 or 4, the robot control plan 171 represents a plurality of control commands relevant to each of a plurality of states of the robot 20 (for example, the position of the robot 20) executed by the control unit 14. Then, in the above-described case, the control unit 14 resumes the control of the robot 20 by executing a control command having the highest relevance with the state of the stopped robot 20 (for example, the position of the robot 20). More specifically, for example, it is assumed that control of the robot 20 is temporarily stopped in a state where the distal end portion of the robot 20 is near coordinates (3, 5, 8). Then, it is assumed that the robot control plan 171 newly selected by the selection unit 13 is the robot control plan 171 illustrated in FIG. 2. In this case, the control unit 14 resumes the control of the robot 20 from the control command after 0.4 seconds for moving the robot 20 to the coordinates (3, 5, 8) in the robot control plan exemplified in FIG. 2.

Next, an operation (processing) in which the robot control device 10 according to the present example embodiment generates the robot control plan 171 will be described in detail with reference to the flowchart of FIG. 7.

The control environment prediction unit 15 predicts a communication delay time in the communication network 40 with respect to communication between the robot control device 10 and the robot controller 21 (step S101). The generation unit 11 determines a predetermined number (n) of control cycles based on the communication delay time prediction value 173 and the control cycle determination criterion 174 (step S102). The generation unit 11 generates the robot control plans 171-1 to 171-$n$ for the determined n control cycles (step S103), and the entire process is terminated.

Next, an operation (processing) in which the robot control device 10 according to the present example embodiment controls the robot 20 using the robot control plan 171 will be described in detail with reference to a flowchart of FIG. 8.

The acquisition unit 12 acquires the communication delay time 172 in the communication network 40 related to communication between the robot control device 10 and the robot controller 21 (step S201). The selection unit 13 determines, as a selection candidate of the robot control plan 171, the robot control plan 171 regarding a control cycle that is larger than the total time of the acquired round-trip communication delay time 172 and the robot operation time in one control cycle (step S202).

The required time prediction unit 16 predicts the required time required for completion of the predetermined work by the robot 20 for each of the robot control plans 171 that are selection candidates (step S203). The selection unit 13 selects, as the robot control plan 171 to be used for control of the robot 20, a selection candidate in which the predicted required time satisfies the selection criterion 175 among the selection candidates of the robot control plan 171 (step S204). The control unit 14 controls the robot 20 using the selected robot control plan 171 (step S205), and the entire process is terminated.

The robot control device 10 according to the present example embodiment can suitably control the robot 20 according to the control environment of the robot 20 in a case where the control cycles of the robot 20 depends on the varying control environment of the robot. This is because the robot control device 10 generates the robot control plans 171 for each of the plurality of control cycles and controls the robot 20 using the robot control plan 171 selected according to the acquired communication delay time 172 in the communication network 40.

Hereinafter, effects achieved by the robot control device 10 according to the present example embodiment will be described in detail.

There is an algorithm for calculating the optimum operation of the robot according to the work (also referred to as task) performed by the robot. The algorithm may be referred to as, for example, goal-oriented task planning. This algorithm automatically achieves optimization of an order of tasks and optimization of movement (motion) of a robot that executes each task for the tasks given by a user (for example, moving a plurality of objects to a target location).

In this algorithm, the work target, the motion equation of the robot, the environment information obtained from the camera, and the like are input, and the coordinates (for example, in the case of a robot including a robot arm (manipulator), coordinates of a distal end of the robot arm) of the robot for each time of the control cycle are output. The server (information processing device) that controls the robot implements the operation of the robot by periodically inputting a result of calculating the optimum operation of the robot using the algorithm to the robot controller at the control cycle. In a case where the server cannot be installed near the robot, for example, there is a configuration in which the server and the robot controller are connected by a communication network to remotely control the robot.

As described above, when the server that calculates the control plan for the robot (controls the robot) and the robot controller are connected by the communication network, for example, it is necessary to calculate the control plan based on the control cycle in consideration of the communication delay time in the communication network. Then, in a case where the communication delay time of the communication network fluctuates, it is necessary to calculate a control plan of the robot assuming a case where the communication delay time is the maximum.

In the control plan of the robot, the shorter the control cycle of the robot, the smoother the trajectory and the speed change can be given to the robot. That is, when the control cycle is longer, the amount of control information of the robot per unit time is smaller, so that it is not possible to perform control in such a way that the robot moves smoothly, and the possibility that the robot collides with an obstacle increases, so that the operation (movable) range of the robot is also limited. Therefore, for example, there is a problem that the communication delay time decreases due to the fluctuation of the communication delay time in the communication network, and the robot is controlled assuming a case where the communication delay time is maximum although the robot is originally in a state of being able to perform control in such a way that the robot moves more smoothly, so that suitable control of the robot cannot be performed.

In view of such a problem, the robot control device 10 according to the present example embodiment includes the generation unit 11, the acquisition unit 12, the selection unit 13, and the control unit 14, and operates as described above with reference to FIGS. 1 to 8, for example. That is, the generation unit 11 generates robot control plans 171-1 to 171-$n$ (an example of control information) for controlling the robot 20 for each of a plurality of control cycles for the robot 20 to be controlled. The acquisition unit 12 acquires the robot control plan 171 relevant to the control cycles. The selection unit 13 selects any one of the plurality of robot control plans 171-1 to 171-$n$ based on the acquired robot control plan 171 and the relevance between the robot control plan 171 and the control cycle. Then, the control unit 14 controls the robot 20 using the selected robot control plan 171. As a result, the robot control device 10 can suitably control the robot 20 according to the control environment of the robot 20 when the control cycle of the robot 20 depends on the varying control environment of the robot.

The robot control device 10 according to the present example embodiment acquires the communication delay time 172 at any time while controlling the robot 20 and selects any one of the plurality of robot control plans 171-1 to 171-$n$ at any time according to the acquired communication delay time 172. When the robot control plan 171 in use is different from the newly selected robot control plan 171, the robot control device 10 temporarily stops the control of the robot 20, and then resumes the control of the robot 20 using the newly selected robot control plan 171. At this time, the robot control device 10 resumes the control of the robot 20 by executing a control command having the highest relevance with the state of the stopped robot 20 (for example, the position of the robot 20) among the control commands included in the newly selected robot control plan 171. As a result, even in an environment where the communication delay time 172 frequently fluctuates, the robot control device 10 can flexibly cope with the fluctuation and maintain suitable control of the robot 20.

The robot control device 10 according to the present example embodiment predicts the communication delay time 172, determines a predetermined number of control cycles based on the communication delay time prediction value 173 and the control cycle determination criterion 174, and generates the robot control plans 171 for each of determined control cycles. As a result, the robot control device 10 can efficiently generate the plurality of robot control plans 171.

The robot control device 10 according to the present example embodiment predicts the required time required for completion of the predetermined work by the robot 20 for the case of using each robot control plan 171 and selects the robot control plan 171 having the shortest required time. As a result, the robot control device 10 can end the predetermined work by the robot 20 in a short time.

The robot control device 10 according to the present example embodiment selects the robot control plan 171 having the longest control cycle among the robot control plans 171 satisfying that the predicted required time is equal to or less than the restriction time 176 (threshold value). As a result, the robot control device 10 can reduce the communication amount between the robot control device 10 and the robot controller 21 as much as possible under the condition that the required time is not necessarily the shortest and it is sufficient that the time is within the restriction time 176.

The robot control device 10 according to the present example embodiment displays identification information capable of identifying the selected robot control plan 171 on the display device. As a result, the user of the robot control device 10 can easily grasp that which robot control plan 171 among the plurality of robot control plans 171 is controlling the operating robot 20.

The robot control device 10 according to the present example embodiment outputs a log including the acquired communication delay time 172 and identification information capable of identifying the selected robot control plan 171. As a result, the robot control device 10 can facilitate future analysis work and the like by the user for improving the generation algorithm of the robot control plan 171, for example.

Although the robot control device 10 according to the present example embodiment described above uses the communication delay time 172 as the control environment information relevant to the control cycles of the robot 20, the robot control device 10 may use information different from the communication delay time 172 as the control environment information. For example, in an environment where the arrangement situation of the obstacles in the vicinity of the robot 20 fluctuates, there is a relevance between the arrangement situation of the obstacles and the control cycle. More specifically, for example, when there is almost no obstacle in the vicinity of the robot 20, the robot control device 10 may control the robot 20 in such a way that the motion in one control cycle increases in a long control cycle. On the other hand, when there are many obstacles in the vicinity of the robot 20, the robot control device 10 is required to control the robot 20 in such a way that the robot moves smoothly in a short control cycle in such a way that the robot 20 does not collide with the obstacle. That is, in this case, the robot control device 10 may use the arrangement status of obstacles in the vicinity of the robot 20 as the control environment information.

Second Example Embodiment

Figure 9:
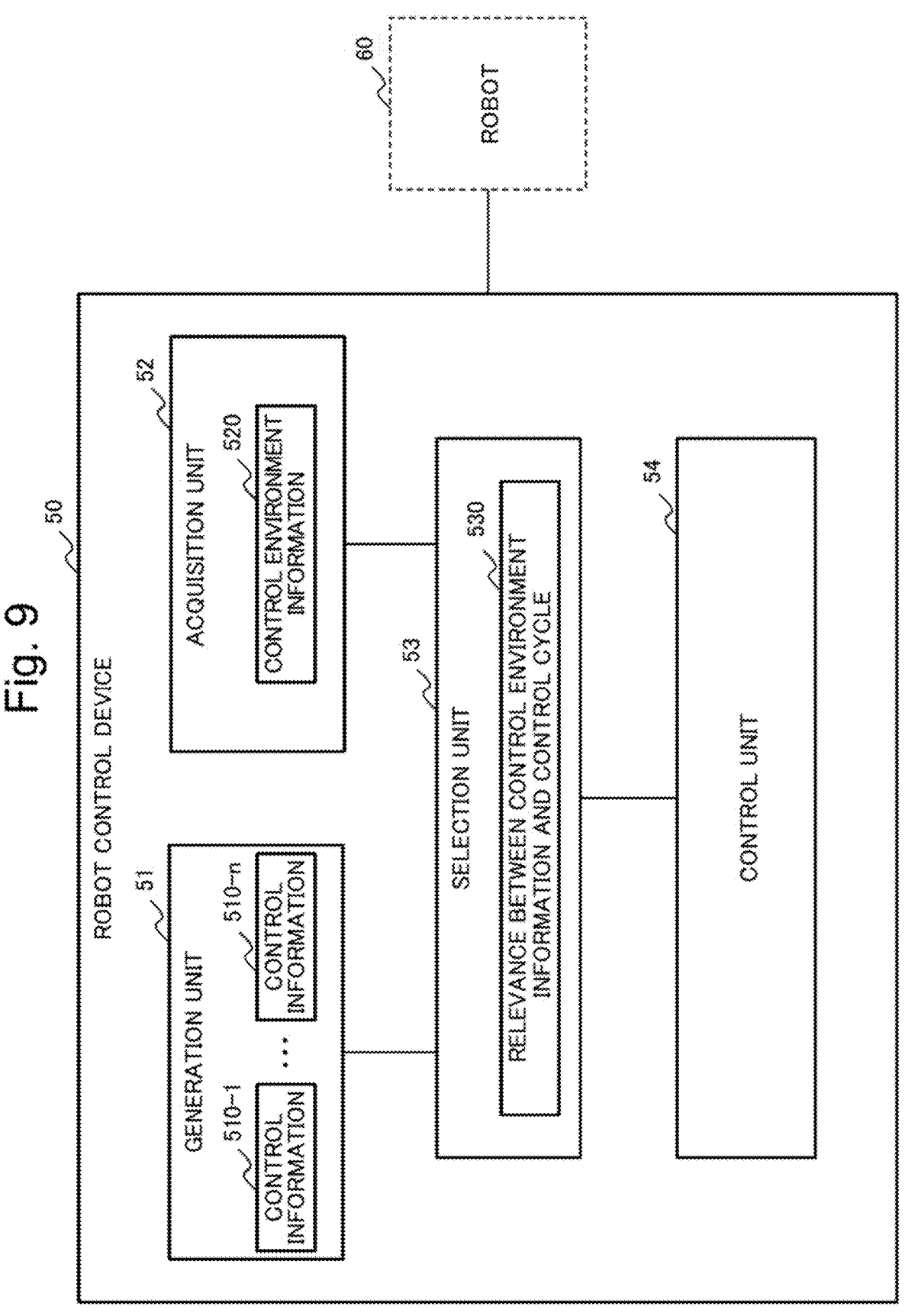
FIG. 9 is a block diagram showing a configuration of a robot control device according to the second example embodiment of the present invention.

FIG. 9 is a block diagram showing a configuration of a robot control device 50 according to a second example embodiment of the present invention. The robot control device 50 includes a generation unit 51, an acquisition unit 52, a selection unit 53, and a control unit 54. However, the generation unit 51, the acquisition unit 52, the selection unit 53, and the control unit 54 are examples of a generation means, an acquisition means, a selection means, and a control means, respectively.

The generation unit 51 generates a plurality of pieces of control information 510-1 to 510-$n$ (n is an any integer of 2 or more) for controlling the robot 60 for each of a plurality of control cycles for the robot 60 to be controlled. The robot 60 is, for example, a robot similar to the robot 20 according to the first example embodiment. The plurality of pieces of control information 510-1 to 510-$n$ is, for example, information similar to the robot control plans 171-1 to 171-$n$ according to the first example embodiment. The generation unit 51 operates as in the generation unit 11 according to the first example embodiment, for example.

The acquisition unit 52 acquires a control environment information 520 relevant to the control cycles. The control environment information 520 is, for example, information similar to the communication delay time 172 according to the first example embodiment. The acquisition unit 52 operates as in the acquisition unit 12 according to the first example embodiment, for example.

The selection unit 53 selects any one of the plurality of pieces of control information 510-1 to 510-$n$ based on the acquired control environment information 520 and a relevance 530 between the control environment information and the control cycle. The relevance 530 between the control environment information and the control cycle is, for example, information similar to the selection criterion 175 according to the first example embodiment. The selection unit 53 operates as in the selection unit 13 according to the first example embodiment, for example.

The control unit 14 controls a robot 60 using the selected control information 510-$i$ (i is any one of integer 1 to n). The control unit 54 operates as in the control unit 14 according to the first example embodiment, for example.

The robot control device 50 according to the present example embodiment can suitably control the robot 60 according to the control environment of the robot 60 in a case where the control cycles of the robot 60 depends on the varying control environment of the robot. This is because the robot control device 50 generates the plurality of pieces of control information 510-1 to 510-$n$ related to each of the plurality of control cycles and controls the robot 60 using the control information 510-$i$ selected according to the acquired control environment information 520.

Hardware Configuration Example

Each unit in the robot control device 10 illustrated in FIG. 1 or the robot control device 50 illustrated in FIG. 9 in each example embodiment described above can be achieved by dedicated hardware (HW) (electronic circuit). In FIGS. 1 and 9, at least the following configurations can be regarded as a function (processing) unit (software module) of a software program.

The generation units 11 and 51,
The acquisition units 12 and 52,
The selection units 13 and 53,
The control units 14 and 54,
The control environment prediction unit 15,
The required time prediction unit 16,
The storage control function in the storage unit 17.

The division of each unit illustrated in these drawings is a configuration for convenience of description, and various configurations can be assumed at the time of implementation. An example of a hardware environment in this case will be described with reference to FIG. 10.

Figure 10:
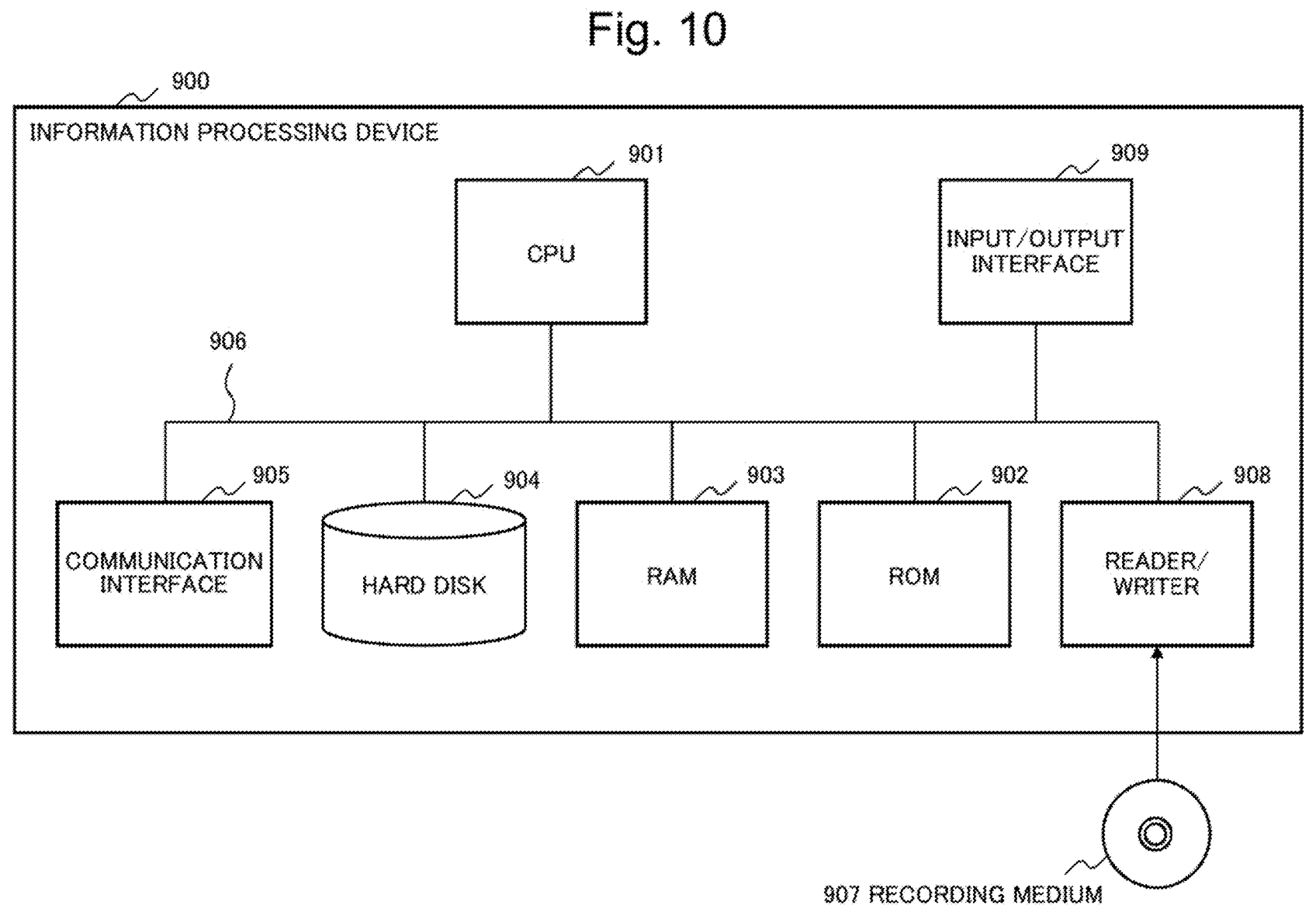

FIG. 10 is a diagram exemplarily describing a configuration of an information processing device 900 (computer) capable of achieving the robot control device 10 according to the first example embodiment or the robot control device 50 according to the second example embodiment of the present invention. That is, FIG. 10 illustrates a configuration of a computer (information processing device) capable of achieving the robot control devices 10 and 50 illustrated in FIGS. 1 and 9 and illustrates a hardware environment capable of achieving each function in the above-described example embodiment.

The information processing device 900 illustrated in FIG. 10 includes the following components as components but may not include some of the following components.

A central processing unit (CPU) 901,

A read only memory (ROM) 902,

A random access memory (RAM) 903,

A hard disk (storage device) 904,

A communication interface 905 with an external device,

A bus 906 (communication line),

A reader/writer 908 capable of reading and writing data stored in a recording medium 907 such as a compact disc read only memory (CD-ROM), An input/output interface 909 such as a monitor, a speaker, or a keyboard.

That is, the information processing device 900 including the above-described components is a general computer to which these components are connected via the bus 906. The information processing device 900 may include a plurality of CPUs 901 or may include a CPU 901 configured by a plurality of cores. The information processing device 900 may include a graphical_processing_unit (GPU) (not illustrated) in addition to the CPU 901.

Then, the present invention described using the above-described example embodiment as an example supplies a computer program capable of achieving the following functions to the information processing device 900 illustrated in FIG. 10. The function is the above-described configuration in the block configuration diagram (FIGS. 1 and 9) referred to in the description of the example embodiment or the function of the flowchart (FIGS. 7 and 8). Thereafter, the present invention is achieved by reading, interpreting, and executing the computer program on the CPU 901 of the hardware. The computer program supplied into the device may be stored in a readable/writable volatile memory (RAM 903) or a non-volatile storage device such as the ROM 902 or the hard disk 904.

In the above case, a general procedure can be used at present as a method of supplying the computer program into the hardware. Examples of the procedure include a method of installing the program in the apparatus via various recording media 907 such as a CD-ROM, a method of downloading the program from the outside via a communication line such as the Internet, and the like. In such a case, the present invention can be understood to be configured by a code constituting the computer program or the recording medium 907 storing the code.

The present invention has been described above using the above-described example embodiments as exemplary examples. However, the present invention is not limited to the above-described example embodiments. That is, it will be understood by those of ordinary skill in the art that the present invention can have various aspects without departing from the spirit and scope of the present invention as defined by the claims.

Note that part or all of each example embodiment described above can also be described as the following Supplementary Notes. However, the present invention exemplarily described by the above-described example embodiments is not limited to the following.

Supplementary Note 1

A robot control device including:

at least one memory storing a computer program; and at least one processor configured to execute the computer program to generate control information for controlling a robot to be controlled for each of a plurality of control cycles for the robot, acquire control environment information relevant to the control cycles, select any one of a plurality of pieces of the control information based on the acquired control environment information and a relevance between the control environment information and the control cycles, and control the robot using the selected control information.

Supplementary Note 2

The robot control device according to Supplementary Note 1, wherein the control environment information represents a communication delay time with the robot.

Supplementary Note 3

The robot control device according to Supplementary Note 2, wherein the processor is configured to execute the computer program to select the control information that satisfies that the control cycle is longer than a sum of the round-trip communication delay time with the robot and a time required for an operation of the robot in one of the control cycle.

Supplementary Note 4

The robot control device according to Supplementary Note 1, wherein the processor is configured to execute the computer program to acquire the control environment information at any time while the robot is controlled, select any one of the plurality of pieces of the control information at any time, and when the control information in use is different from the newly selected control information, temporarily stop control of the robot, and then resume control of the robot using the newly selected control information.

Supplementary Note 5

The robot control device according to Supplementary Note 4, wherein the control information represents a plurality of control commands relevant to each of a plurality of states of the robot, and the processor is configured to execute the computer program to resume control of the robot by executing the control command having the highest relevance to a state of the stopped robot of the plurality of control commands.

Supplementary Note 6

The robot control device according to Supplementary Note 1, wherein the processor is configured to execute the computer program to predict a value represented by the control environment information, determine a predetermined number of the control cycles based on the predicted value and a predetermined criterion and generate the control information for each of the determined control cycles.

Supplementary Note 7

The robot control device according to Supplementary Note 1, wherein the processor is configured to execute the computer program to predict a required time required for completion of a predetermined work by the robot for a case where each of the plurality of pieces of control information is used, and select the control information having the shortest required time of the plurality of pieces of control information.

Supplementary Note 8

The robot control device according to Supplementary Note 1, wherein the processor is configured to execute the computer program to predict a required time required for completion of a predetermined work by the robot for a case where each of the plurality of pieces of control information is used, and select the control information having the longest control cycle of the plurality of pieces of control information satisfying that the required time is equal to or less than a threshold value.

Supplementary Note 9

The robot control device according to Supplementary Note 1, wherein the processor is configured to execute the computer program to display identification information capable of identifying the selected control information on a display device.

Supplementary Note 10

The robot control device according to Supplementary Note 1, wherein the processor is configured to execute the computer program to output a log including the acquired control environment information and identification information capable of identifying the selected control information.

Supplementary Note 11

A robot control method including, by an information processing device, generating control information for controlling a robot to be controlled for each of a plurality of control cycles for the robot, acquiring control environment information relevant to the control cycles, selecting any one of a plurality of pieces of the control information based on the acquired control environment information and a relevance between the control environment information and the control cycles, and controlling the robot using the selected control information.

Supplementary Note 12

A non-volatile computer-readable recording medium storing a robot control program for causing a computer to execute generating control information for controlling a robot to be controlled for each of a plurality of control cycles for the robot, acquiring control environment information relevant to the control cycles, selecting any one of a plurality of pieces of the control information based on the acquired control environment information and a relevance between the control environment information and the control cycles, and controlling the robot using the selected control information.

The invention claimed is:

1. A robot control device comprising:

at least one memory storing a computer program; and at least one processor configured to execute the computer program to:

generate control information for controlling a robot to be controlled for each of a plurality of control cycles for the robot;

acquire control environment information relevant to the control cycles;

select any one of a plurality of pieces of the control information based on the acquired control environment information and a relevance between the control environment information and the control cycles;

control the robot using the selected control information;

acquire the control environment information at any time while the robot is controlled;

select any one of the plurality of pieces of the control information at any time; and when the control information in use is different from the newly selected control information, temporarily stop control of the robot, and then resume control of the robot using the newly selected control information.

2. The robot control device according to claim 1, wherein the control environment information represents a communication delay time with the robot.

3. The robot control device according to claim 2, wherein the processor is configured to execute the computer program to:

select the control information that satisfies that the control cycle is longer than a sum of the round-trip communication delay time with the robot and a time required for an operation of the robot in one of the control cycles.

4. The robot control device according to claim 1 wherein the control information represents a plurality of control commands relevant to each of a plurality of states of the robot, and wherein the processor is configured to execute the computer program to:

resume control of the robot by executing the control command having the highest relevance to a state of the stopped robot of the plurality of control commands.

5. A robot control device comprising:

at least one memory storing a computer program; and at least one processor configured to execute the computer program to:

generate control information for controlling a robot to be controlled for each of a plurality of control cycles for the robot;

acquire control environment information relevant to the control cycles;

select any one of a plurality of pieces of the control information based on the acquired control environment information and a relevance between the control environment information and the control cycles;

control the robot using the selected control information;

predict a value represented by the control environment information; and determine a predetermined number of the control cycles based on the predicted value and a predetermined criterion and generate the control information for each of the determined control cycles.

6. The robot control device according to claim 1, wherein the processor is configured to execute the computer program to:

predict a required time required for completion of a predetermined work by the robot for a case where each of the plurality of pieces of control information is used; and select the control information having the shortest required time of the plurality of pieces of control information.

7. A robot control device comprising:

at least one memory storing a computer program; and at least one processor configured to execute the computer program to:

generate control information for controlling a robot to be controlled for each of a plurality of control cycles for the robot;

acquire control environment information relevant to the control cycles;

select any one of a plurality of pieces of the control information based on the acquired control environment information and a relevance between the control environment information and the control cycles;

control the robot using the selected control information;

predict a required time required for completion of a predetermined work by the robot for a case where each of the plurality of pieces of control information is used; and select the control information having the longest control cycle of the plurality of pieces of control information satisfying that the required time is equal to or less than a threshold value.

8. The robot control device according to claim 1, wherein the processor is configured to execute the computer program to:

display identification information capable of identifying the selected control information on a display device.

9. The robot control device according to claim 1, wherein the processor is configured to execute the computer program to:

output a log including the acquired control environment information and identification information capable of identifying the selected control information.

\* \* \* \* \*